Nov. 15, 1927.
M. C. HAMMOND
OIL AND WATER SEPARATOR FOR OIL WELLS
Filed Nov. 13, 1924  3 Sheets-Sheet 1
1,649,524
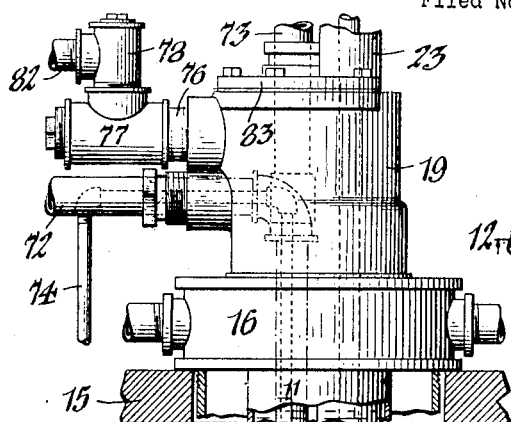
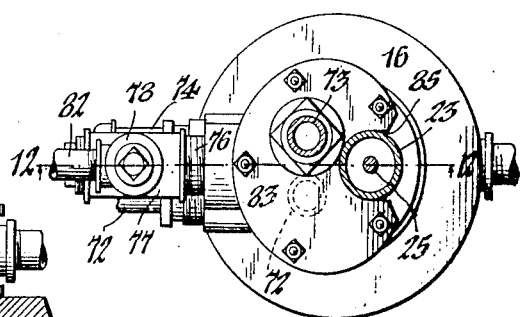
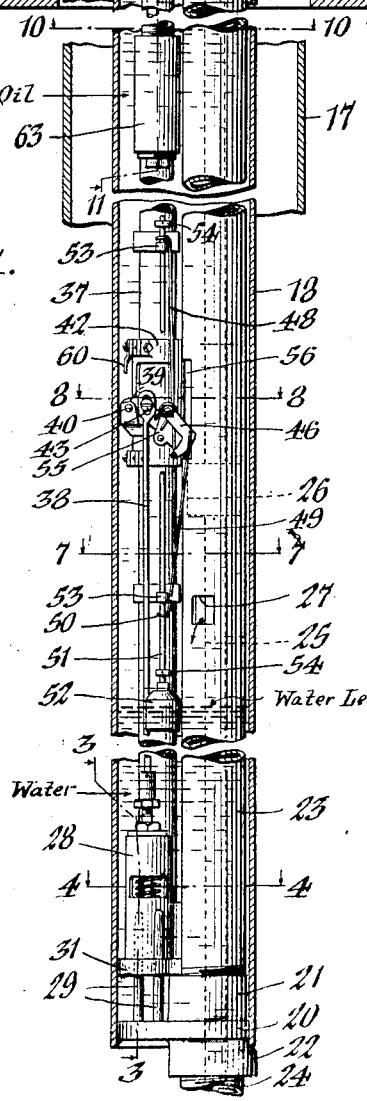
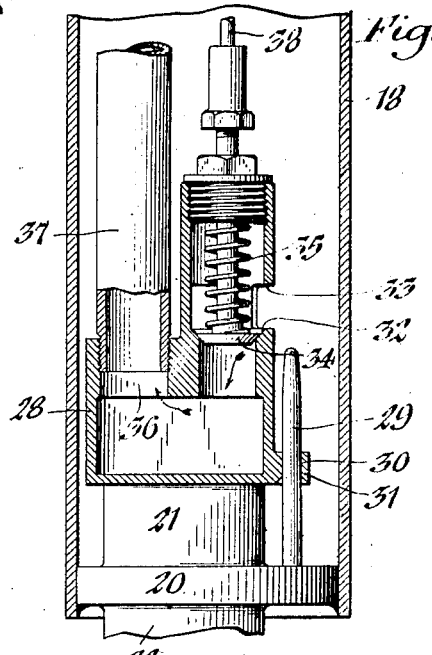
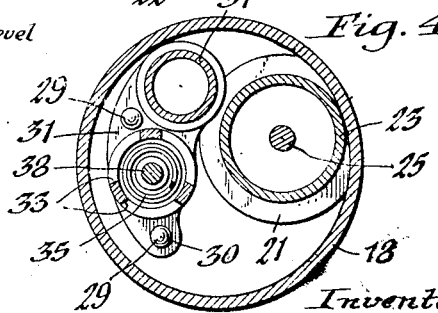
Inventor,
Mark C. Hammond,
by Geyer & Geyer
Attorneys.

Nov. 15, 1927.

M. C. HAMMOND

OIL AND WATER SEPARATOR FOR OIL WELLS

Filed Nov. 13, 1924   3 Sheets-Sheet 2

Inventor,
Mark C. Hammond,
by Geyer & Geyer
Attorneys.

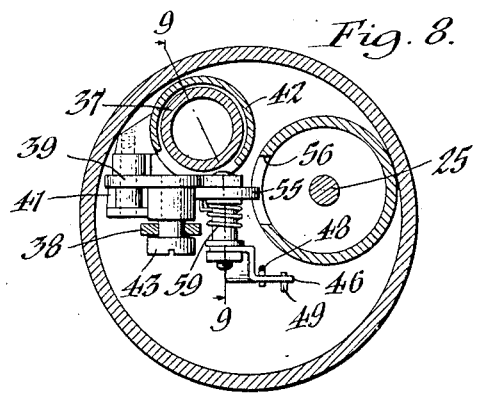
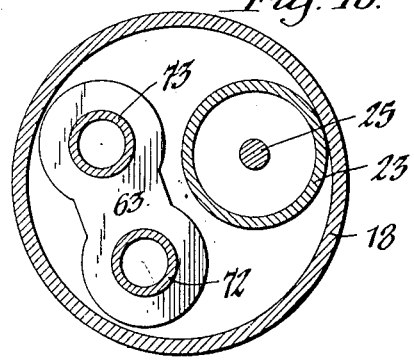
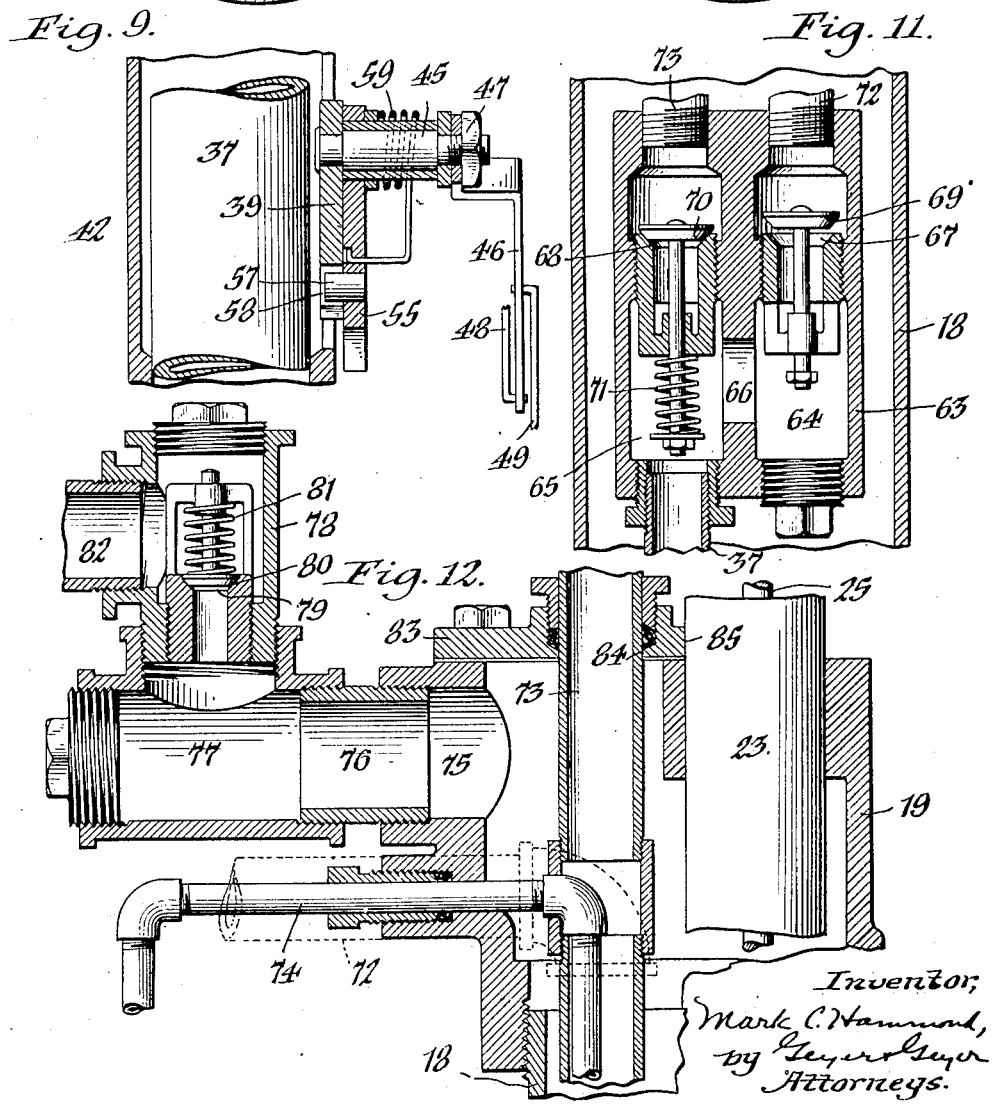

Patented Nov. 15, 1927.

1,649,524

UNITED STATES PATENT OFFICE.

MARK C. HAMMOND, OF RICHBURG, NEW YORK, ASSIGNOR TO FOREST OIL CORPORATION, OF BRADFORD, NEW YORK, A CORPORATION OF NEW YORK.

OIL AND WATER SEPARATOR FOR OIL WELLS.

Application filed November 13, 1924. Serial No. 749,659.

This invention relates to an oil and water separating apparatus which is designed more particularly for use with well-pumping equipment.

The principal object of the invention is to provide a novel and efficient apparatus of this character which will automatically separate the water from the oil during the pumping of the well.

Another object is to provide an oil and water separator which is so constructed as to obtain the oil from the bottom of the well and convey it directly to the storage tanks without interruption and without coming in contact with the atmosphere, thus eliminating the evaporation of the oil.

A further object of the invention is to provide a separator of this type which is constructed for disposition entirely within the well, which is comparatively simple and compact in construction, and which is reliable in operation.

Other objects of the invention reside in the construction and arrangement of parts hereinafter described and particularly pointed out in the appended claims.

Figure 5:
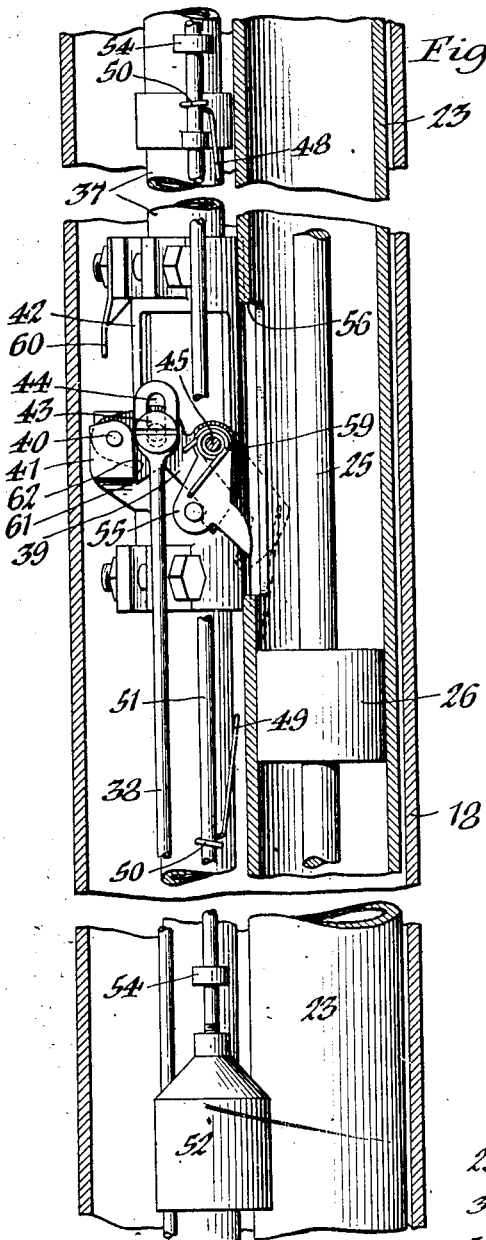
Figure 6:
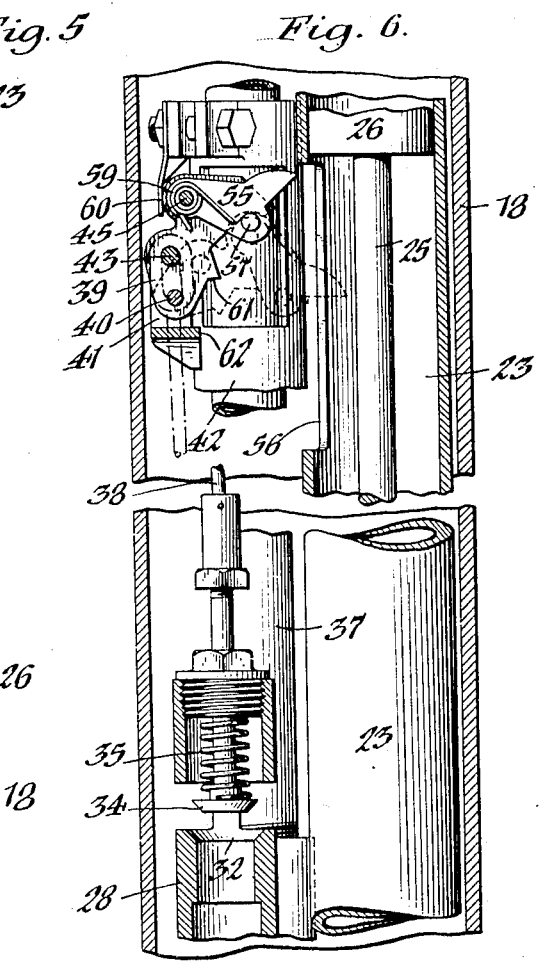
Figure 7:
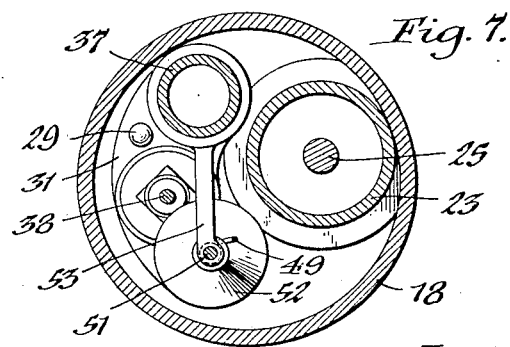

In the accompanying drawings:—Figure 1 is a fragmentary sectional elevation of the apparatus embodying my improvements. Figure 2 is a top plan view thereof. Figure 3 is an enlarged transverse vertical section on line 3—3, Fig. 1. Figure 4 is an enlarged horizontal section on line 4—4, Fig. 1. Figure 5 is an enlarged sectional elevation showing the water valve control mechanism. Figure 6 is an enlarged sectional elevation similar to Fig. 5, showing the parts in a different position. Figure 7 is an enlarged horizontal section on line 7—7, Fig. 1. Figure 8 is an enlarged horizontal section on line 8—8, Fig. 1. Figure 9 is an enlarged transverse vertical section on line 9—9, Fig. 8. Figure 10 is an enlarged horizontal section on line 10—10, Fig. 1. Figure 11 is an enlarged transverse vertical section on line 11—11, Fig. 1. Figure 12 is an enlarged fragmentary vertical section on line 12—12, Fig. 2.

Similar characters of reference indicate corresponding parts throughout the several views.

Referring more particularly to Fig. 1, the numeral 15 indicates the floor of a derrick, 16 the usual casing head and 17 the well-casing which is suspended from the latter in the usual manner. Contained within the well casing and extending from the upper end thereof to a point, say, about twenty feet from the top of the well, is a tubular vessel or reservoir 18 for receiving the liquid pumped from the well. This vessel is suspended from a head 19 which rests with its lower end on the upper side of the casing head 16. At its lower end the tubular vessel is provided with a plug or closure 20 constituting a pipe-reducer which may be welded or otherwise secured in place to form a fluid-tight joint, as shown in Figs. 1 and 3. Extending from opposite sides of this reducer are offset collars 21, 22 to which are connected alining pipe or tubing sections 23, 24, the upper section 23 extending upwardly through the vessel 18 and its head to a suitable point above the floor of the derrick, while the lower tubing section 24 extends to the bottom of the well. Operating in these tubing sections is the usual sucker rod 25 reciprocated by the walking beam of the pump mechanism and having a collar 26 fastened thereto and movable in the tubing section 23. In its side, the latter has a discharge port or opening 27 through which the oil and water are emptied into the vessel 18 during the pumping operation. As the pumping operation progresses, the vessel gradually fills up with oil and water, the water going to the bottom and the oil to the top, these elements thereafter being separated and discharged automatically by the apparatus presently to be described.

Located in the lower end of the tubular vessel 18 above the pipe-reducer 20 is a suitable water valve for controlling the discharge of water therefrom. As shown in Figs. 1, 3 and 4, this water valve preferably comprises a casing 28 which rests at its lower end on the upper reducing collar 21, upright guide pins 29, rising from the reducer and engaging openings 30 in the flanged portion 31 of the valve casing, serving to properly position the latter in the lower end of the well-tubing. This casing is provided in its top at one side thereof with a water-inlet port 32 which communicates through openings 33 with the interior of the vesssel 18 and which is controlled by a downwardly closing valve 34, a spring 35 being employed for normally holding said valve closed. An outlet port 36 is arranged in the top wall of the casing alongside the inlet port 32 and a main water outlet pipe 37 is fitted into this port and extends upwardly through the fluid-filled vessel. When the valve 34 is open, the water in the vessel enters the valve-casing 28 through its inlet port and thence is discharged into the water-outlet pipe 37. The water valve 34 has a rod 38 connected therewith which extends upwardly through the vessel and which is operatively connected to means for automatically governing the opening and closing movements of said valve.

This valve control mechanism is located a considerable distance above the bottom of the vessel 18, say, about seven and one-half feet, and is preferably constructed as follows:

The numeral 39 indicates a vertically-swinging main valve-actuating lever fulcrumed at 40 to a bracket 41 formed on a sleeve 42 suitably fastened to the water outlet pipe 37. The upper end of the valve rod is pivotally connected by a pin or screw 43 with this valve-actuating lever, so that, as the latter swings up or down, the valve is accordingly opened or closed. The upper end of the valve rod has a longitudinal slot 44 through which the pivot screw passes and which permits a slight movement of the valve lever relative to the valve rod, the valve spring 35 tending constantly to urge the valve toward its seat, regardless of the position of the valve actuating lever. Mounted on the latter, beyond the point of attachment of the valve rod therewith is a horizontal pin 45 on the outer end of which an arm 46 is clamped, as shown in Figs. 1, 8 and 9, said arm being held rigidly relatively to the valve lever by a nut 47 applied to the threaded outer end of the pin. Connected to this arm and extending above and below the same, are shifting rods or wires 48, 49 which terminate at their free ends in coils 50 loosely surrounding the suspension rod 51 of a float 52 suspended in the vessel 18. Said float is so designed that it will sink in oil and float on water, so that as the level of the water in the vessel rises and falls, the float will move likewise. The float rod is guided on brackets 53 which may be attached to the water-outlet pipe 37 above and below its sleeve 42. Near its upper and lower ends, the float rod is provided with collars or shoulders 54 which are adapted to engage the corresponding coils of the shifting rods 48, 49 for moving the valve actuating lever 39 in one direction or the other, accordingly as the water level rises or falls.

The purpose of the float and its connections with the valve lever 39 is primarily to initially bring the latter to a predetermined position preparatory to the actual opening or closing movements of the water valve taking place, such movements being governed by other devices. The mechanism for effecting the final movement of this valve lever to cause the opening of the water control valve 34, preferably consists of a trip arm 55 fulcrumed on the horizontal pin 45 of the valve lever and arranged to swing into and out of an opening 56 formed in the upper section 23 of the sucker rod tubing, so that it will be disposed, when projected, in the path of the collar 26 of the sucker rod. As shown in Figs. 8 and 9, this trip arm is arranged alongside the valve lever 39 and carries a coupling pin 57 which is adapted to abut against a shoulder 58 formed on the opposing lower edge of said lever, a coil spring 59 applied to the horizontal pin 45 and connected at its free ends to these parts serving to maintain them in the fixed relation shown in Figs. 5 and 6. By mounting the trip arm in this manner, the spring permits it to yield or swing independently of the valve-lever should the trip arm be in the path of the sucker rod collar on its down stroke. In this case, the trip arm, upon being struck by the sucker rod collar, will simply swing outwardly independently of the valve-lever, thus relieving the latter and its associated parts of any undue strain or breakage which might otherwise occur. The length of the valve lever is such that it clears the sucker rod tubing during its swinging movements while the trip arm extends beyond the free end of said lever. After the float has initially raised the valve-lever sufficiently to bring its trip arm into the path of movement of the sucker rod, as shown by dotted lines in Fig. 6, the collar of the latter, on its next upward stroke, encounters the trip arm and swings it together with the valve lever to the position shown by full lines in Fig. 6, thereby opening the water valve 34. In this position it will be noted, that the axis of the valve rod pivot screw 43 is beyond the axis of the valve lever fulcrum 40, with the result that the valve spring 35 tends to maintain the valve lever in its elevated position in addition to holding the water valve open. The upward swinging movement of the valve lever is limited by a suitable stop 60 carried by the sleeve 42, while its downward movement is limited by a shoulder 61 formed on its bottom edge and arranged to engage the base portion 62 of the bracket 41. When the float has again lowered by reason of the water in the vessel 18 having been displaced through the water-outlet pipe 37, the upper collar 54 of the float rod engages the coil 50 of the upper shifting rod 48, thereby swinging the valve lever downwardly. As soon as the axis of the pivot screw 43 of the valve rod 38 moves beyond the dead center line passing through the fulcrum of the valve-lever, the spring 35 of the water valve automatically closes the latter and at the same time returns the valve lever to its retracted position, shown in Figs. 1, 3 and 5.

Disposed above the water valve-actuating mechanism, and about five feet below the ground line, is a supplementary valve for automatically controlling the expulsion of water from the main outlet pipe 37 to one or the other of a pair of auxiliary outlets which may discharge on to the ground. This supplementary valve is preferably of the duplex type and consists of a casing 63 mounted on the upper end of the water-outlet pipe and communicating therewith, as shown in Fig. 11. The valve chambers 64, 65 are arranged on opposite sides of the casing and communicate with each other through a transverse port 66, the water-outlet pipe opening directly into the chamber 65. Said valve chambers have outlet ports 67, 68 which are controlled by downwardly-closing valves 69, 70, respectively, the valve 69 being closed by gravity and the valve 70 having a spring 71 applied thereto for normally holding it closed. Screwed into the upper end of the valve-casing, for communication with the corresponding outlet ports, are auxiliary water-outlet pipes 72, 73 which extend upwardly through the vessel head 19 and thence to a suitable discharge point. As shown in Fig. 1, the auxiliary outlet pipe 72 preferably extends laterally through the vessel head while the other auxiliary water pipe 73 extends upwardly through the top of said tubing head. In mild weather, that is, when the temperature does not go below freezing, the water in the main water outlet-pipe 37 enters the valve chamber 65 and is expelled through the gravity-controlled valve 69 into the auxiliary outlet pipe 72. Under the condition above mentioned, the water, after entering the valve casing 63 takes the course of least resistance and hence flows through the outlet port 67 of the gravity-controlled valve. Should the auxiliary water pipe 72 freeze up, as does happen in cold weather, the water then seeks the next course of least resistance which is through the port 68 controlled by the spring-pressed valve 70 and thence out through the auxiliary outlet pipe 73.

In order to remove any water left standing in the auxiliary water pipe 72, the same may be provided with a siphon 74, one branch of which extends into said pipe, while the other branch is arranged on the outside of the vessel-head 19, as shown in Figs. 1 and 12.

The vessel-head is provided near its upper end with an oil outlet 75 which may be connected by a short pipe 76 with a T-fitting 77 to which is connected a suitable valve casing 78 containing a port 79 communicating with said T-fitting. Contained in this valve-casing is a downwardly-closing valve 80 which is normally held closed by a coil spring 81. A discharge pipe 82 is connected to this valve casing for conveying the oil to a tank or other suitable receptacle. The spring of the oil valve is somewhat stronger than the spring 71 of the water outlet valve 70 of the supplementary valve-casing 63, so that when the water is being discharged through either of the auxiliary water-outlet pipes 72, 73, the oil valve will remain closed, it being understood that when the oil is flowing from the well, the water-inlet valve 34 is closed. As before stated, this water-inlet valve is normally held closed by the spring 35 and can only be opened when the mechanism controlled by the float 52 is actuated to lift the valve off its seat, as when the water rises to a predetermined level in the vessel during the pumping operation. When this happens and the water valve is opened to discharge the water into the pipe 27, the oil level is correspondingly lowered in the vessel and no oil can escape through the outlet valve 80. When the water level is again lowered, the water valve is automatically closed; as soon as the oil level reaches the outlet port 79, the resulting oil pressure opens the valve 80 and allows the oil to be discharged. This operation continues until the water level is again raised, the mechanism functioning automatically to alternately separate the water and oil while pumping the well.

The vessel-head 19, as shown in Fig. 12, is open at its upper end and provided with a cover 83 which may be bolted or otherwise fastened thereto. It has an opening 84 through which the auxiliary water-outlet pipe 73 extends and a recess 85 through which the tubing 23 passes. In removing the separating mechanism from the vessel 18, it is only necessary to disconnect the horizontal sections of the auxiliary water-outlet pipe 72 and the siphon 74 and thereafter withdraw the remaining parts through the vessel-head.

The operation of the apparatus is as follows:

When the well pumping mechanism is set in operation the tubular vessel 18 fills up with oil and water clear to the top of the vessel-head, the water going to the bottom and the oil to the top. Assume the water level to be such, that the float 52 has reached a position in which it has effected the automatic closing of the water inlet valve 34 in the lower end of the vessel, which position of parts is shown in Figs. 1, 3 and 5. As the pumping continues, the mixture of oil and water is pumped through the port 27 of the tubing-section 23 into the vessel thereby causing the oil valve 80 to open and permit the oil to be discharged through the pipe 82. During this time, the water lever is raised and the float is moved with it accordingly.

As the float is raised, its lower collar 54 engages the coil of the lower shifting rod 49 resulting in the main valve-actuating lever 39 being raised to the position shown by dotted lines in Fig. 6, wherein the trip arm 55 extends through the tubing-opening 56 into the path of movement of the sucker rod collar. Upon the upstroke of the sucker rod, its collar encounters the trip arm and moves it together with the valve lever to the position shown by full lines in Fig. 6. This movement effects the opening of the water inlet valve 34 and causes the water in the vessel 18 to rush through the port 32 into the valve casing 28 and thence into the outlet pipe 37. From the latter, it flows into the upper valve casing 63 and through the port 67 controlled by the gravity valve 69 into the corresponding auxiliary outlet pipe 72. Should this auxiliary outlet pipe be frozen up, as the result of the sucker rod breaking on a cold night and the pumping mechanism therefore rendered inoperative, the water will then after the parts have been repaired, be diverted through the port 68 controlled by the spring pressed valve 70 and thence be discharged through the corresponding auxiliary outlet pipe 73. During the time the water is being expelled, the water level is lowered and likewise the float. At a predetermined point, the upper collar 54 of the float rod engages the coil of the upper shifting rod 48 and causes the valve actuating lever 39 to be swung to its retracted or lowered position, thereby closing the water inlet valve 34. Any water left standing in the outlet-pipe 73, after the valve 70 is closed, is drawn off through the siphon 74, that leg of the latter within said pipe 73 extending to a point below the ground line to prevent the water below such point from freezing. The final movement of these parts is assisted by the valve spring 35 which insures a quick return of said parts to their initial position. The water valve being now closed, the oil again is discharged through the oil valve 80, which is opened by the pressure of the rising column of liquid in the vessel 18.

I claim as my invention:

1. In an apparatus of the character described, the combination with the well-casing and the tubing of a well-pumping equipment, of a vessel extending into the well-casing and surrounding the tubing for receiving the liquid pumped through said tubing, and automatic means contained in said vessel for controlling the separate discharge of oil and water therefrom.

2. In an apparatus of the character described, the combination with the well-casing and the tubing of a well-pumping equipment, of a vessel extending into the well-casing and surrounding the tubing for receiving the water and oil pumped through said tubing, and means governed by one of the liquids in said vessel for alternately controlling the separate discharge of water and oil therefrom.

3. In an apparatus of the character described, the combination with the well-casing and the tubing of a well-pumping equipment, of a vessel extending into the well-casing and surrounding the tubing for receiving the water and oil pumped through said tubing, and automatic means contained in said vessel and governed primarily by one of the liquids therein for alternately controlling the separate discharge of water and oil therefrom.

4. In an apparatus of the character described, the combination with the well-casing and the tubing of a well-pumping equipment, of a vessel extending into the well-casing and surrounding the tubing for receiving the water and oil pumped therethrough, the vessel having an oil outlet and a passage for the water extending upwardly through said vessel and communicating with the water column therein, and an automatically operated valve in said passage for controlling the discharge of water from said vessel into said passage, the water level in the vessel governing the discharge of oil through its outlet.

5. An oil and water separator for oil wells, comprising a vessel disposed within the well and arranged to be filled with water and oil pumped from the well, the vessel having an oil outlet at its upper end and a water outlet at its lower end, and valves applied to said outlets, the oil outlet valve being controlled by the oil pressure in the vessel, and automatic means for governing the opening and closing movements of the water outlet valve, to effect the alternate discharge of water and oil from said vessel.

6. An oil and water separator for oil wells having a pump including a reciprocating element, comprising a vessel disposed within the well for receiving the water and oil pumped therefrom, the vessel having an oil outlet, a water-outlet pipe arranged in said vessel and having an inlet port in communication with the water column in the vessel, a valve applied to said port, and means in said vessel for actuating said valve, said means being controlled partly by the level of the water in the vessel and partly by the reciprocating element of the pump.

7. An oil and water separator for oil wells, having a pump including a reciprocating element, comprising a vessel disposed within the well for receiving the water and oil pumped therefrom, the vessel having an oil outlet, a water-outlet pipe arranged in said vessel and having an inlet port in communication with the water column in the vessel, a valve applied to said port, and an actuating member for said valve movable into and out of the path of the reciprocating element of the pump.

8. An oil and water separator for oil wells having a pump including a reciprocating element, comprising a vessel disposed within the well for receiving the water and oil pumped therefrom, the vessel having an oil outlet, a water-outlet pipe arranged in said vessel and having an inlet port in communication with the water column in the vessel, a valve applied to said port, an actuating member for said valve arranged to be projected at predetermined intervals into the path of the reciprocating element of the pump, and means responsive to the change of the water-level in the vessel for bringing said member into and out of its projected position.

9. An oil and water separator for oil wells having a pump including a reciprocating element, comprising a vessel disposed within the well for receiving the water and oil pumped therefrom, the vessel having an oil outlet, a water-outlet pipe arranged in said vessel and having an inlet port in communication with the water column in the vessel, a valve applied to said port, an actuating member for said valve arranged to be projected into the path of the reciprocating element of the pump, a float in the water column of the vessel and connections between the float and said actuating member.

10. An oil and water separator for oil wells having a pump including a reciprocating element, comprising a vessel disposed within the well for receiving the water and oil pumped therefrom, the vessel having an oil outlet, a water-outlet pipe arranged in said vessel and having an inlet port in communication with the water column in the vessel, a valve applied to said port, an actuating member for said valve arranged to be projected into the path of the reciprocating element of the pump, a float in the water column of the vessel, said float including a guide rod having collars near its upper and lower ends, and links connected at one end to said actuating member, the other ends of said links being disposed in the path of movement of the respective float-rod collars.

11. An oil and water separator for oil wells having a pump including a reciprocating element, comprising a vessel disposed within the well for receiving the water and oil pumped therefrom, the vessel having an oil outlet, a water-outlet pipe arranged in said vessel and having an inlet port in communication with the water column in the vessel, a valve applied to said port, and an actuating member for said valve including a main portion directly connected to the valve and a trip portion arranged to be projected into the path of the reciprocating element of the pump.

12. An oil and water separator for oil wells having a pump including a reciprocating element, comprising a vessel disposed within the well for receiving the water and oil pumped therefrom, the vessel having an oil outlet, a water-outlet pipe arranged in said vessel and having an inlet port in communication with the water column in the vessel, a valve applied to said port, and an actuating member for said valve including a vertically swinging main portion directly connected to the valve and a trip portion fulcrumed on said main portion and arranged be be projected into the path of the reciprocating element of the pump, said portions being compelled to move as a unit when the trip portion is moved in one direction but the latter being free to move in the opposite direction independently of the main portion.

13. An oil and water separator for oil wells having a pump including a reciprocating element, comprising a vessel disposed within the well for receiving the water and oil pumped therefrom, the vessel having an oil outlet, a water-outlet pipe arranged in said vessel and having an inlet port in communication with the water column in the vessel, a valve applied to said port, and an actuating member for said valve including a vertically-swinging lever operatively connected to the valve and having a shoulder thereon, a trip arm fulcrumed on the free end of said lever and arranged to be projected into the path of the reciprocating element of the pump, a coupling pin carried by said trip arm for engagement with the shoulder of said lever, and a spring for normally resisting movement of the trip arm in a direction to disengage its coupling pin from engagement with the lever-shoulder.

14. An oil and water separator for oil wells having a pump including a reciprocating element, comprising a vessel disposed within the well for receiving the water and oil pumped therefrom, the vessel having an oil outlet, a water-outlet pipe arranged in said vessel and having an inlet port in communication with the water column in the vessel, a valve applied to said port and having a rod therefor, a vertically-swinging lever disposed above said valve and having a limited lost motion connection with said valve-rod, a trip arm pivoted to the free end of said lever and free to rock in one direction but held against relative movement in the opposite direction, and means connected with said lever and controlled by the level of the water in said vessel for shifting the same in a direction to bring its trip arm into the path of the reciprocating element of the pump.

15. An oil and water separator for oil wells having a pump including a reciprocating element, comprising a vessel disposed within the well for receiving the water and oil pumped therefrom, the vessel having an oil outlet, a water-outlet pipe arranged in said vessel and having an inlet port in communication with the water column in the vessel, a valve applied to said port, a vertically-swinging actuating member for said valve movable into and out of the path of the reciprocating element of the pump, and means for limiting the movement of said member in both directions.

16. An oil and water separator for oil wells having a pump including a reciprocating element, comprising a vessel disposed within the well for receiving the water and oil pumped therefrom, the vessel having an oil outlet, a water-outlet pipe arranged in said vessel and having an inlet port in communication with the water column in the vessel, a valve applied to said port, a spring for normally holding said valve closed, a vertically-swinging actuating member for said valve movable into and out of the path of the reciprocating element of the pump whereby the valve is opened on the upstroke of such pump-element, and means for limiting the movement of said actuating member in both directions, said valve-spring tending to maintain the valve-actuating member in its elevated position while the valve is open.

17. An oil and water separator for oil wells, comprising a vessel disposed within the well for receiving the water and oil pumped therefrom, the vessel having an oil outlet, a water-outlet pipe arranged in said vessel and having an inlet port at its lower end in communication with the water column in the vessel, a valve for controlling said port, a valve casing at the upper end of said valve outlet pipe having a pair of outlet ports, and valves applied to said ports.

18. An oil and water separator for oil wells comprising a vessel disposed within the well for receiving the water and oil pumped therefrom, the vessel having an oil outlet, a water-outlet pipe arranged in said vessel and having an inlet port at its lower end in communication with the water column in the vessel, a valve for controlling said port, a valve casing at the upper end of said outlet pipe having a pair of outlet ports, and valves applied to said ports, one of said valves being normally held closed by gravity, and a spring for normally holding the other valve closed.

19. An oil and water separator for oil wells, comprising a vessel disposed within the well for receiving the water and oil pumped therefrom, the vessel having an oil outlet, a water-outlet pipe arranged in said vessel and having an inlet port at its lower end in communication with the water column in the vessel, a valve for controlling said port, a valve casing at the upper end of said outlet pipe having a pair of outlet ports, auxiliary outlet pipes communicating with said ports, valves applied to the latter, and a siphon having one of its legs disposed in one of the auxiliary outlet pipes.

20. An oil and water separator for oil wells, comprising a vessel disposed within the well for receiving the water and oil pumped therefrom, the vessel having an oil outlet, a spring-pressed valve normally closing said oil outlet, a water-outlet pipe arranged in said vessel and having an inlet port at its lower end and an outlet port at its upper end, said inlet port communicating with the water column in the vessel, a valve for controlling said inlet port, and a spring-pressed valve normally closing said water-outlet port, the spring of the oil-outlet valve being stronger than the spring of the water outlet valve.

21. In an apparatus of the character described, the combination with the tubing and the sucker rod of a well-pumping equipment, the tubing having a fluid outlet therein, of a vessel disposed in the well to be filled with water and oil discharged through said tubing outlet, and means for controlling the separate discharge of water and oil from said vessel, said means being partly governed by the level of the water in the vessel and partly by the sucker rod.

22. In an apparatus of the character described, the combination with the tubing and the sucker rod of a well-pumping equipment, the tubing having a fluid outlet and an opening therein, of a vessel disposed in the well to be filled with water and oil discharged through said tubing-outlet, the vessel having an oil outlet, a water-outlet pipe arranged in said vessel and having an inlet port in communication with the water column in the vessel, a valve applied to said port, and an actuating member for said valve movable into and out of said tubing-opening for engagement with the sucker rod.

23. In an apparatus of the character described, the combination with the tubing and the sucker rod of a well-pumping equipment, the tubing having a fluid outlet and an opening therein, of a vessel disposed in the well to be filled with the water and oil discharged through said tubing-outlet, the vessel having an oil outlet, a water-outlet pipe arranged in said vessel and having an inlet port in communication with the water column in the vessel, a valve applied to said port, an actuating member for said valve movable into and out of said tubing-opening for engagement with the sucker rod, and means governed by the level of the water in said vessel for bringing said actuating member in position to be engaged by said sucker rod.

24. In an apparatus of the character described, the combination with the tubing and the sucker rod of a well pumping equipment, the tubing having a fluid outlet and an opening therein, of a vessel disposed in the well to be filled with water and oil discharged through said tubing-outlet, the vessel having an oil outlet, a water-outlet pipe arranged in said vessel and having an inlet port in communication with the water column in the vessel, a valve applied to said port, a vertically-swinging actuating lever for said valve having a part adapted to extend into said tubing-opening for engagement with the sucker rod, and float-controlled means connected with said valve-actuating lever for bringing its sucker rod-engaging part into and out of the tubing-opening.

25. In an apparatus of the character described, the combination with the tubing and the sucker rod of a well-pumping equipment, the tubing having a fluid outlet, and an opening therein, of a vessel disposed in the well to be filled with water and oil discharged through said tubing-outlet, the vessel having an oil outlet and a water-outlet pipe arranged in said vessel and having an inlet port in communication with the water column in the vessel, a valve applied to said port, a vertically-swinging actuating lever for said valve, a trip arm pivoted to said lever to be rigid therewith when moved in one direction but movable independently thereof in the opposite direction, float-controlled means connected with said valve-actuating lever for swinging said lever in one direction or the other to project or retract said trip arm through said tubing-opening into or out of the path of the sucker rod, and means normally tending to hold said valve closed and the actuating lever in its lower inoperative position.

26. In an apparatus of the character described, the combination with the tubing of a well-pumping equipment, the tubing having a fluid outlet therein, of a vessel disposed in the well about the tubing and adapted to be filled with water and oil discharged through said tubing-outlet, the vessel having an oil outlet, a valve casing contained within the lower end of said vessel and having a water inlet opening into the latter and a water outlet, a pipe connected to said water-outlet, a valve controlling said inlet, and automatic means for actuating said water-inlet valve.

MARK C. HAMMOND.